(12) United States Patent
Bittner et al.

(10) Patent No.: US 8,684,080 B2
(45) Date of Patent: Apr. 1, 2014

(54) USE OF SURFACTANT MIXTURES OF POLYCARBOXYLATES FOR MICROEMULSION FLOODING

(75) Inventors: Christian Bittner, Bensheim (DE); Günter Oetter, Frankenthal (DE); Jack Tinsley, Mannheim (DE); Christian Spindler, Ludwigshafen (DE); Sophie Vogel, Mannheim (DE); Gabriela Alvarez-Juergenson, Mannheim (DE); Marcus Guzmann, Mühlhausen (DE)

(73) Assignee: BASF SE, Ludwigshafen (DE)

( * ) Notice: Subject to any disclaimer, the term of this patent is extended or adjusted under 35 U.S.C. 154(b) by 352 days.

(21) Appl. No.: 13/044,375

(22) Filed: Mar. 9, 2011

(65) Prior Publication Data

US 2011/0220353 A1   Sep. 15, 2011

Related U.S. Application Data

(60) Provisional application No. 61/394,369, filed on Oct. 19, 2010.

(30) Foreign Application Priority Data

Mar. 10, 2010   (EP) .................................... 10002491

(51) Int. Cl.
*E21B 43/22*   (2006.01)
(52) U.S. Cl.
USPC .................................... 166/270.1; 166/270.2
(58) Field of Classification Search
None
See application file for complete search history.

(56) References Cited

U.S. PATENT DOCUMENTS

| | | | |
|---|---|---|---|
| 2,842,492 A | 7/1958 | Von Engelhardt et al. | |
| 3,039,529 A | 6/1962 | McKennon | |
| 3,811,504 A | 5/1974 | Flournoy et al. | |
| 4,049,054 A * | 9/1977 | Wier | 166/270.1 |
| 4,266,610 A | 5/1981 | Meister | |
| 4,638,865 A | 1/1987 | Lawrence et al. | |
| 4,825,950 A * | 5/1989 | Kalpakci et al. | 166/270.1 |
| 4,951,921 A * | 8/1990 | Stahl et al. | 166/270.1 |
| 2007/0267193 A1 * | 11/2007 | Hills et al. | 166/264 |
| 2008/0194435 A1 | 8/2008 | Huff et al. | |
| 2009/0159288 A1 * | 6/2009 | Horvath Szabo et al. | 166/300 |
| 2009/0264598 A1 | 10/2009 | Bittner | |
| 2009/0270281 A1 | 10/2009 | Steinbrenner | |
| 2010/0331510 A1 | 12/2010 | Reichenbach-Klinke | |

FOREIGN PATENT DOCUMENTS

WO   WO-2006/131541 A1   12/2006

OTHER PUBLICATIONS

U.S. Appl. No. 12/733,370.
U.S. Appl. No. 61/046,585.
U.S. Appl. No. 61/160,124.
U.S. Appl. No. 61/251,310.
U.S. Appl. No. 61/251,314.
U.S. Appl. No. 61/251,315.
U.S. Appl. No. 61/264,846.
U.S. Appl. No. 61/304,850.
U.S. Appl. No. 61/312,292.
U.S. Appl. No. 61/312,294.
U.S. Appl. No. 61/312,302.

* cited by examiner

*Primary Examiner* — Angela M DiTrani
(74) *Attorney, Agent, or Firm* — Novak Druce Connolly Bove + Quigg LLP

(57) ABSTRACT

The present invention relates to processes for tertiary mineral oil production with the aid of a surfactant mixture and to the use of a surfactant mixture for tertiary mineral oil production by means of Winsor type III microemulsion flooding, by injecting a surfactant mixture through at least one aqueous injection borehole into a mineral oil deposit, and withdrawing crude oil from the deposit through at least one production borehole, wherein the surfactant mixture, for the purpose of lowering the interfacial tension between oil and water to <0.1 mN/m, comprises at least the following components: (a) one or more polycarboxylate(s) comprising at least 50 mol % of acrylic acid units and/or methacrylic acid units and/or maleic acid units and/or itaconic acid units or salts thereof, and (b) one or more anionic and/or nonionic surfactant(s).

10 Claims, No Drawings

USE OF SURFACTANT MIXTURES OF POLYCARBOXYLATES FOR MICROEMULSION FLOODING

CROSS-REFERENCE TO RELATED APPLICATIONS

This Application claims priority to European patent application no. 10002491.8 filed on Mar. 10, 2010 in European Patent Office. This Application also claims the benefit of U.S. Provisional Application 61/394,369 filed on Oct. 19, 2010. The contents of each of the foregoing references are incorporated herein by reference in their entireties.

FIELD OF THE INVENTION

The invention relates to the use of a surfactant mixture comprising one or more polycarboxylate(s) and anionic and/or nonionic surfactants for tertiary mineral oil production by means of Winsor type III microemulsion flooding, and to processes for mineral oil production.

BACKGROUND OF THE INVENTION

In natural mineral oil deposits, mineral oil is present in the cavities of porous reservoir rocks which are sealed toward the surface of the earth by impervious top layers. The cavities may be very fine cavities, capillaries, pores or the like. Fine pore necks may, for example, have a diameter of only about 1 µm. As well as mineral oil, including fractions of natural gas, a deposit comprises water with a greater or lesser salt content.

In mineral oil production, a distinction is generally drawn between primary, secondary and tertiary production. In primary production, the mineral oil flows, after commencement of drilling of the deposit, of its own accord through the borehole to the surface owing to the autogenous pressure of the deposit.

After primary production, secondary production is therefore used. In secondary production, in addition to the boreholes which serve for the production of the mineral oil, the so-called production bores, further boreholes are drilled into the mineral oil-bearing formation. Water is injected into the deposit through these so-called injection bores in order to maintain the pressure or to increase it again. As a result of the injection of the water, the mineral oil is forced slowly through the cavities into the formation, proceeding from the injection bore in the direction of the production bore. However, this only works for as long as the cavities are completely filled with oil and the more viscous oil is pushed onward by the water. As soon as the mobile water breaks through cavities, it flows on the path of least resistance from this time, i.e. through the channel formed, and no longer pushes the oil onward.

By means of primary and secondary production, generally only approx. 30 to 35% of the amount of mineral oil present in the deposit can be produced.

It is known that the mineral oil yield can be enhanced further by measures for tertiary oil production. A review of tertiary oil production can be found, for example, in "Journal of Petroleum Science of Engineering 19 (1998)", pages 265 to 280. Tertiary oil production includes, for example, thermal methods in which hot water or steam is injected into the deposit. This lowers the viscosity of the oil. The flow medium used may likewise be gases such as $CO_2$ or nitrogen.

Tertiary mineral oil production also includes methods in which suitable chemicals are used as assistants for oil production. These can be used to influence the situation toward the end of the water flow and as a result also to produce mineral oil hitherto held firmly within the rock formation.

Viscous and capillary forces act on the mineral oil which is trapped in the pores of the deposit rock toward the end of the secondary production, the ratio of these two forces relative to one another being determined by the microscopic oil separation. By means of a dimensionless parameter, the so-called capillary number, the action of these forces is described. It is the ratio of the viscosity forces (velocity×viscosity of the forcing phase) to the capillary forces (interfacial tension between oil and water×wetting of the rock):

$$N_c = \frac{\mu v}{\sigma \cos\theta}.$$

In this formula, $\mu$ is the viscosity of the fluid mobilizing mineral oil, $v$ is the Darcy velocity (flow per unit area), $\sigma$ is the interfacial tension between liquid mobilizing mineral oil and mineral oil, and $\theta$ is the contact angle between mineral oil and the rock (C. Melrose, C. F. Brandner, J. Canadian Petr. Techn. 58, October-December, 1974). The higher the capillary number, the greater the mobilization of the oil and hence also the degree of oil removal.

It is known that the capillary number toward the end of secondary mineral oil production is in the region of about $10^{-6}$ and that it is necessary to increase the capillary number to about $10^{-3}$ to $10^{-2}$ in order to be able to mobilize additional mineral oil.

For this purpose, it is possible to conduct a particular form of the flooding method—what is known as microemulsion flooding. In microemulsion flooding, the injected surfactants should form a Winsor type III microemulsion with the water phase and oil phase present in the deposit. A Winsor type III microemulsion is not an emulsion with particularly small droplets, but rather a thermodynamically stable, liquid mixture of water, oil and surfactants. The three advantages thereof are that

- a very low interfacial tension 6 between mineral oil and aqueous phase is thus achieved,
- it generally has a very low viscosity and as a result is not trapped in a porous matrix,
- it forms with even the smallest energy inputs and can remain stable over an infinitely long period (conventional emulsions, in contrast, require high shear forces which predominantly do not occur in the reservoir, and are merely kinetically stabilized).

The Winsor type III microemulsion is in an equilibrium with excess water and excess oil. Under these conditions of microemulsion formation, the surfactants cover the oil-water interface and lower the interfacial tension 6 more preferably to values of $<10^{-2}$ mN/m (ultra-low interfacial tension). In order to achieve an optimal result, the proportion of the microemulsion in the water-microemulsion-oil system, with a defined amount of surfactant, should by its nature be at a maximum, since the larger the microemulsion phase, the lower the interfacial tension is.

In this manner, it is possible to alter the form of the oil droplets (interfacial tension between oil and water is lowered to such a degree that the smallest interface state is no longer favored and the spherical form is no longer preferred), and they can be forced through the capillary openings by the flooding water.

When all oil-water interfaces are covered with surfactant, in the presence of an excess amount of surfactant, the Winsor type III microemulsion forms. It thus constitutes a reservoir for surfactants which cause a very low interfacial tension between oil phase and water phase. By virtue of the Winsor type III microemulsion being of low viscosity, it also migrates through the porous deposit rock in the flooding process (emulsions, in contrast, can become trapped in the porous matrix and block deposits). When the Winsor type III microemulsion meets an oil-water interface as yet uncovered with surfactant, the surfactant from the microemulsion can significantly lower the interfacial tension of this new interface, and lead to mobilization of the oil (for example by deformation of the oil droplets).

The oil droplets can subsequently combine to a continuous oil bank. This has two advantages:

Firstly, as the continuous oil bank advances through new porous rock, the oil droplets present there can coalesce with the bank.

Moreover, the combination of the oil droplets to give an oil bank significantly reduces the oil-water interface and hence surfactant no longer required is released again. Thereafter, the surfactant released, as described above, can mobilize oil droplets remaining in the formation.

Microemulsion flooding is consequently an exceptionally efficient process, and requires much less surfactant compared to an emulsion flooding process. In microemulsion flooding, the surfactants are typically optionally injected together with co-solvents and/or basic salts. Subsequently, a solution of thickened polymer is injected for mobility control. A further variant is the injection of a mixture of thickening polymer and surfactants, co-solvents and/or basic salts, and then a solution of thickening polymer for mobility control. These solutions should generally be clear in order to prevent blockages of the reservoir. This is difficult especially if the basic salts used are alkali metal hydroxides or alkali metal carbonates, since alkaline earth metal ions present in the deposit form insoluble complexes with hydroxide or carbonate ions.

The requirements on surfactants for tertiary mineral oil production differ significantly from requirements on surfactants for other applications: suitable surfactants for tertiary oil production should reduce the interfacial tension between water and oil (typically approx. 20 mN/m) to particularly low values of less than $10^{-2}$ mN/m in order to enable sufficient mobilization of the mineral oil. This has to be done at the customary deposit temperatures of approx. 15° C. to 130° C. and in the presence of water of high salt contents, more particularly also in the presence of high proportions of calcium and/or magnesium ions; the surfactants thus also have to be soluble in deposit water with a high salt content.

The use parameters, for example type, concentration and mixing ratio of the surfactants used with respect to one another, are therefore adjusted by the person skilled in the art according to the conditions existing in a given oil formation (for example temperature and salt content).

To fulfill these requirements, there have already been frequent proposals of mixtures of surfactants, especially mixtures of anionic and nonionic surfactants.

U.S. Pat. No. 3,811,504 discloses a mixture of two different anionic surfactants and a nonionic surfactant for use in deposits whose deposit water comprises 0.15 to 1.2 percent calcium and magnesium ions. The first anionic surfactant comprises alkyl sulfonates having 5 to 25 carbon atoms or alkylaryl sulfonates whose alkyl radicals have 5 to 25 carbon atoms, and the second comprises alkyl polyethoxy sulfates whose alkyl radicals have 7 to 20 carbon atoms, and the nonionic surfactant comprises ethoxylated alkylphenols whose alkyl radicals have 6 to 20 carbon atoms, or aliphatic alcohols having 5 to 20 carbon atoms.

K. Wyatt and colleagues describe, in "Economics of Field Proven Chemical Flooding Technologies", SPE 113126, Conference contribution for the SPE Symposium On Improved Oil Recovery annual meeting, the advantages of deposit exploitation using the ASP (Alkali-Surfactant-Polymer) method, one of the most economic methods in the field of Chemical Enhanced Oil Recovery.

As early as the 1990s, BASF AG described the use of EDTA as a complexing agent in the oil field or as an additive in oil production.

BRIEF SUMMARY OF THE INVENTION

It was therefore an object of the present invention to provide a surfactant mixture for the use for tertiary mineral oil production by means of microemulsion flooding, which firstly causes a very great lowering in interfacial tension and secondly effectively prevents the precipitation of alkaline earth metal hydroxides or alkaline earth metal carbonates.

Accordingly, the use of a surfactant mixture for tertiary mineral oil production by means of Winsor type III microemulsion flooding has been found, in which an aqueous surfactant formulation is injected through at least one injection borehole into a mineral oil deposit and crude oil is withdrawn from the deposit through at least one production borehole, wherein the surfactant mixture comprises at least the following components:
  (a) one or more polycarboxylate(s) comprising at least 50 mol % of acrylic acid units and/or methacrylic acid units and/or maleic acid units and/or itaconic acid units or salts thereof, and
  (b) one or more anionic and/or nonionic surfactants.

The object is likewise achieved by a process for tertiary mineral oil production by means of Winsor type III microemulsion flooding, comprising the steps of
  (a) injecting a surfactant mixture as specified herein through at least one aqueous injection borehole into a mineral oil deposit and
  (b) withdrawing crude oil from the deposit through at least one production borehole.

It has been found that, surprisingly, using the inventive surfactant mixture, it is possible both to drastically reduce the lowering of the interfacial tension between oil and water and to substantially suppress the precipitation of alkaline earth metal hydroxides or alkaline earth metal carbonates during microemulsion flooding.

DETAILED DESCRIPTION OF THE PREFERRED EMBODIMENTS

With regard to the invention, the following should be stated specifically:

In the above-described process according to the invention for mineral oil production by means of microemulsion flooding, a surfactant formulation comprising the polycarboxylate and at least one anionic and/or nonionic surfactant is used.

In the process according to the invention for tertiary mineral oil production by means of microemulsion flooding, the use of the surfactant mixture lowers the interfacial tension between oil and water to values of <0.1 mN/m, preferably to <0.05 mN/m, more preferably to <0.01 mN/m. The interfacial tension between oil and water is thus lowered to values in the range from 0.1 mN/m to 0.0001 mN/m, preferably to values in the range from 0.05 mN/m to 0.0005 mN/m, more preferably to values in the range from 0.01 mN/m to 0.0001 mN/m.

The polycarboxylate used in the context of the invention preferably comprises polyacrylate, and in a particularly preferred embodiment of the invention especially a homopolymeric polyacrylate. These inventive polymeric polycarboxylates are frequently referred to hereinafter simply as the polycarboxylates.

According to the invention, the polycarboxylate may also comprise copolymeric polycarboxylates, especially those of acrylic acid with methacrylic acid and of acrylic acid or methacrylic acid with maleic acid. Particularly suitable copolymers have been found to be those of acrylic acid with maleic acid which comprise 50 to 90% by weight of acrylic acid and 50 to 10% by weight of maleic acid.

In one embodiment of the invention, the polycarboxylates are preferably in neutralized form, i.e. they have preferably been at least 70 mol % neutralized. In a further preferred embodiment of the invention, the carboxylates are preferably in the form of their alkali metal salts, especially in the form of the sodium salts. In specific embodiments, however, it may also be preferred when the polymers are present in their acid forms, i.e. with a degree of neutralization of less than 50 mol %, preferably of less than 30 mol %.

It is further preferred when these polycarboxylates have a narrow molar mass distribution. A narrow molar mass distribution means in this context that there are distinctly preferred chain lengths and the distribution curve declines significantly on both sides of the maximum. Particularly narrow molar mass distributions exhibit a steep decline. The molar mass distribution is measurable as the ratio of the weight-average molar mass $M_w$ and the number-average molar mass $M_n$ of the polymers. This ratio constitutes a measure of the homogeneity or inhomogeneity and, the broader the molar mass distribution, the greater it is. Defined molecular compounds possess an $M_w/M_n$ ratio=1. Polymers, in contrast, generally have $M_w/M_n$ ratios significantly greater than 1, and industrial polymers may quite possible even have values significantly greater than 10. The polycarboxylates used in accordance with the invention, however, preferably have an $M_w/M_n$ ratio which is less than 10, usually significantly less than 10. Polycarboxylates preferred in accordance with the invention even have an $M_w/M_n$ ratio less than 8, especially even less than 5.

The molar masses specified hereinafter for the polymeric carboxylates are weight-average molar masses $M_w$, all of which have been determined by means of gel permeation chromatography (GPC). The measurement is effected against an external polyacrylate standard which, owing to its structural relationship with the polymers examined, gives realistic molar mass values.

In a preferred embodiment of the invention, the polycarboxylates are polycarboxylates having a molecular weight in the range from 500 to 100 000 g/mol, preferably having a mean molecular weight in the range from 500 to 13 000 g/mol.

In a further preferred embodiment of the invention, the polycarboxylates are carboxylates which comprise at least 80% acrylic acid, preferably at least 90% acrylic acid, or the sodium salt thereof, as a repeat unit.

In a general embodiment of the invention, the at least one anionic or nonionic surfactant, component (B), comprises one or more surfactant(s) selected from the group of the alkyl alkoxylates and alkylaryl alkoxylates.

In a preferred embodiment of the invention, component (B) comprises one or more surfactant(s) selected from the group of the alkyl alkoxy sulfates, alkyl alkoxy sulfonates, alkylaryl sulfates, alkylaryl sulfonates, alkyl alkoxy carboxylates and alkylaryl alkoxy carboxylates.

In a particularly preferred embodiment of the invention, component (B) comprises a surfactant or a surfactant mixture of the general formula $R^2$—O—$(R^3$—O$)_n$—$R^4$ where the $R^2$, $R^3$ and $R^4$ radicals and the number n are each defined as follows:

n is from 3 to 49, $R^2$ is a branched or unbranched hydrocarbon radical which has 6 to 32 carbon atoms and preferably has an average degree of branching of 0 to 5, preferably 1 to 3.5, selected from the group of $R^{2a}$ saturated aliphatic hydrocarbon radicals or $R^{2b}$ unsaturated aliphatic hydrocarbon radicals or $R^{2c}$ phenyl or $R^6$-phenyl where $R^6$ is an alkyl radical having 1 to 24 carbon atoms, $R^{2d}$ phenyl-substituted hydrocarbon radicals of the general formula phenyl-$R^7$ where $R^7$ is a divalent hydrocarbon radical having 1 to 24 carbon atoms, $R^3$ is independently an ethylene or propylene group, with the proviso that the ethylene and propylene groups—if both types of groups are present—may be arranged randomly, alternately or in block structure, and $R^4$ is a group selected from the group of —$SO_3H$, —$PO_3H_2$, $R^5$—COOH, —$R^5$—$SO_3H$ or —$R^5$—$PO_3H_2$ or salts thereof, where $R^5$ is a divalent hydrocarbon group having 1 to 4 carbon atoms.

In the general formula, $R^2$ is an aliphatic and/or aromatic hydrocarbon radical which has 6 to 32 carbon atoms and an average degree of branching of 0 to 5, preferably 1 to 3.5.

The term "degree of branching" is understood here to mean the mean number of carbon atoms in the $R^2$ radical which are bonded to three further atoms apart from hydrogen, plus twice the number of carbon atoms which are bonded to four further atoms apart from hydrogen. This includes the carbon atom joined to the —O—$(R^3$—O$)_n$—$R^4$ group. The terms "average degree of branching" and "mean number of carbon atoms" relate to the fact that not only isomerically pure alcohols can be used to synthesize the component(s) (B) used in accordance with the invention, but also typical industrial alcohol mixtures which may comprise a certain distribution of different alcohols and especially different isomers.

According to the definition, for example, an n-alkyl radical joined to the —O—$(R^3$—O$)_n$—$R^4$ group in the 1 position has a degree of branching of 0 and does not form part of the scope of this invention, while an n-alkyl radical which is joined via one of the nonterminal carbon atoms has a degree of branching of 1. A phenyl group has a degree of branching of 1, and a mono-alkyl-substituted phenyl group a degree of branching of 2.

The $R^2$ radicals are selected from the group of $R^{2a}$, $R^{2b}$, $R^{2c}$ or $R^{2d}$, preferably $R^{2a}$ and $R^{2b}$ and more preferably $R^{2a}$.

$R^{2a}$ comprises saturated aliphatic hydrocarbon radicals having 6 to 32 carbon atoms.

Examples of suitable radicals for $R^{2a}$ comprise alcohols from natural sources, for example C16C18 fatty alcohol.

Further examples of preferred $R^{2a}$ radicals comprise especially radicals which derive from industrial alcohols, especially oxo process alcohols and Guerbet alcohols (e.g. C16, C24, C28 or C32 Guerbet alcohol).

The terms "oxo process alcohol" and "Guerbet alcohol" are known to those skilled in the art. Reference is made by way of example to "alcohols, aliphatic", page 5 and page 10 in Ullmann's Encyclopedia of Industrial Chemistry, 7th Ed., Electronic Release, 2008, Wiley-VCH, Weinheim, New York, and the literature cited therein. In the course of the Guerbet reaction, primary alcohols are ultimately dimerized to α-branched primary alcohols in the presence of suitable catalysts. According to the literature, the primary products formed from the alcohols are aldehydes, which subsequently dimerize as a result of aldol condensation with elimination of water and subsequent hydrogenation to give saturated alcohols. In addition to the main product, it is also possible for various by-products to form, for example unsaturated α-branched primary alcohols if the hydrogenation of the double bond does not proceed to completion, or especially α-branched primary alcohols which have additional branches in the side chain or main chain.

The preferred $R^{2a}$ radical is a radical derived from a Guerbet alcohol, i.e. from an industrial mixture of different radicals, in which at least 65 mol %, preferably at least 80 mol %, of the radicals have the general formula (II)

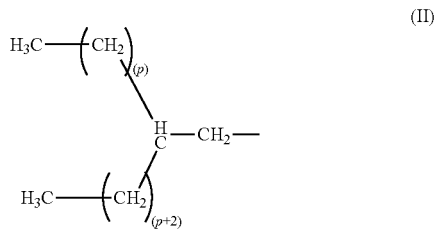

where p may be 2-12.

$R^{2b}$ is an unsaturated aliphatic hydrocarbon radical having 6 to 32 carbon atoms.

The surfactants of component (B) further comprise n —($R^3$—O)— groups. The n $R^3$ radicals are each independently ethylene or propylene groups. The ethylene and propylene groups may—if both types of groups are present—be arranged randomly, alternately or in block structure. Preference is given to a block structure in which the propoxy and ethoxy groups are in fact arranged in the $R^2$O-propoxy block-ethoxy block sequence.

The number n here is from 3 to 49, preferably from 3 to 15. As is known to those skilled in the art, degrees of alkoxylation are average values. The number n is accordingly not a natural number but a rational number.

In general, less than 50% of the n $R^3$ radicals should be ethylene groups.

$R^4$ may be hydrogen. In this case, the surfactant of component (B) is a nonionic surfactant of the general formula $R^2$—O—($R^3$—O)$_n$—H.

In addition, the group may be one selected from the group of —$SO_3H$, —$PO_3H_2$, —$R^5$—COOH, —$R^5$—$SO_3H$ or —$R_5$—$PO_3H_2$ or salts thereof. The $R^5$ group is a divalent hydrocarbon group which has 1 to 4 carbon atoms and may optionally have functional groups, especially —OH, as substituents. The group is preferably one selected from the group of methylene groups —$CH_2$—, 1,2-ethylene groups —$CH_2$—$CH_2$—, 1,2-propylene groups —$CH_2$—CH($CH_3$)— or —CH($CH_3$)—$CH_2$—, or 1,3-propylene groups —$CH_2$—CH($R^8$)—$CH^2$—, where $R^8$ may be H or OH.

Suitable counterions for salts of the surfactants of component B comprise especially $NH_4^+$, ammonium ions with organic radicals, or alkali metal ions, especially $Li^+$, $Na^+$ and $K^+$, and more preferably $Na^+$.

The end groups mentioned result in surfactants of component (B) from the group of the polyether sulfates $R^2$—O—($R^3$—O)$_n$—$SO_3H$, polyether sulfonates $R_2$—O—($R^3$—O)$_n$—$R^5$—$SO_3H$, polyether phosphates $R^2$—O—($R^3$—O)$_n$—$PO_3H_2$, polyether phosphonates $R^2$—O—($R^3$—O)$_n$—$R^5$—$PO_3H_2$ or polyether carboxylates $R^2$—O—($R^3$—O)$_n$—$R^5$—COOH. Preference is given to nonionic surfactants $R^2$—O—($R^3$—O)$_n$—H, polyether sulfates $R^2$—O—($R^3$—O)$_n$—$SO_3H$ and polyether sulfonates $R^2$—O—($R_3$—O)$_n$—$R^5$—$SO_3H$.

Further surfactants (component (C))

In addition to the above-described surfactants of component B, the formulation may additionally optionally comprise further surfactants. These are, for example, anionic surfactants of the olefinsulfonate (alpha-olefinsulfonate or internal olefinsulfonate) type, betaine surfactants and/or nonionic surfactants of the alkyl ethoxylate or alkyl polyglucoside type. These further surfactants may especially also be oligomeric or polymeric surfactants. It is advantageous to use such polymeric co-surfactants to reduce the amount of surfactants needed to form a microemulsion. Such polymeric co-surfactants are therefore also referred to as "microemulsion boosters". Examples of such polymeric surfactants comprise amphiphilic block copolymers which comprise at least one hydrophilic block and at least one hydrophobic block. Examples comprise polypropylene oxide-polyethylene oxide block copolymers, polyisobutene-polyethylene oxide block copolymers, and comb polymers with polyethylene oxide side chains and a hydrophobic main chain, where the main chain preferably comprises essentially olefins or (meth)acrylates as monomers. The term "polyethylene oxide" here should in each case include polyethylene oxide blocks comprising propylene oxide units as defined above. Further details of such surfactants are disclosed in WO 2006/131541 A1.

Use of the surfactant mixture for tertiary mineral oil production

According to the invention, the above-described surfactant mixture of the polycarboxylates (A) and component (B) is used for microemulsion flooding. By significantly lowering the interfacial tension between oil and water, it causes particularly good mobilization of the crude oil in the mineral oil formation. Furthermore, the presence of polycarboxylates, component (A), prevents the precipitation of alkaline earth metal hydroxides or alkaline earth metal carbonates.

According to the invention, the amount of the polycarboxylates, component (A), is preferably 0.01 to 5% by weight, especially 0.01 to 1% by weight, preferably 0.02 to 0.5% by weight, more preferably 0.03 to 0.2% by weight, based on the overall formulation.

According to the invention, the amount of the one or more anionic or nonionic surfactant(s), component (B), in the mixture is preferably 0.05 to 5% by weight, especially 0.05 to 2% by weight, preferably 0.05 to 1% by weight, more preferably 0.1 to 0.5% by weight, based on the overall formulation.

The weight ratio of component (A) to component (B) in the mixture is generally at least 1:9, preferably at least 1:5, more preferably at least 1:3.

For tertiary mineral oil production, the surfactant mixture in the form of a suitable formulation is injected through at least one injection borehole into the mineral oil deposit, and crude oil is withdrawn from the deposit through at least one production borehole. The term "crude oil" in this context of course does not mean single-phase oil, but rather the usual crude oil-water emulsions. In general, a deposit is provided with several injection boreholes and with several production boreholes. After the injection of the surfactant formulation, known as "surfactant flooding", or preferably the microemulsion flooding, the pressure can be maintained by injecting water into the formulation ("water flooding") or preferably a higher-viscosity aqueous solution of a polymer with strong thickening action ("polymer flooding"). Also known, however, are techniques by which the surfactants are first of all allowed to act on the formation. The person skilled in the art is aware of details of the industrial performance of "surfactant flooding", "water flooding", and "polymer flooding", and employs an appropriate technique according to the type of deposit.

For the process according to the invention, the surfactant mixture which comprises components (A) and (B) and optionally component (C) is used. In addition to water, the formulations may optionally also comprise water-miscible or at least water-dispersible organic substances or other substances. Such additives serve especially to stabilize the surfactant solution during storage or transport to the oil field. The amount of such additional solvents should, however, generally not exceed 50% by weight, preferably 20% by weight. In a particularly advantageous embodiment of the invention, exclusively water is used for formulation. Examples of water-miscible solvents include especially alcohols such as methanol, ethanol and propanol, butanol, sec-butanol, pentanol, butyl ethylene glycol, butyl diethylene glycol or butyl triethylene glycol.

The mixture used in accordance with the invention can preferably be used for surfactant flooding of deposits. It is especially suitable for microemulsion flooding (flooding in the Winsor III range or in the range of existence of the bicontinuous microemulsion phase). The technique of microemulsion flooding has already been described in detail at the outset.

In addition to the surfactants, the formulations may also comprise further components, for example $C_4$— to $C_8$ alcohols and/or basic salts (so-called "alkali surfactant flooding"). Such additives can be used, for example, to reduce retention in the formation. The ratio of the alcohols based on the total amount of surfactant used is generally at least 1:1—however, it is also possible to use a significant excess of alcohol. The amount of basic salts may typically range from 0.025% by weight to 5% by weight.

The surfactant mixture preferably comprises basic salts selected from the group of NaOH and $Na_2CO_3$.

The deposits in which the process is employed generally have a temperature of at least 10° C., for example 10 to 150° C., preferably a temperature of at least 15° C. to 120° C.

The total concentration of all surfactants together is preferably 0.05 to 5% by weight, based on the total amount of the aqueous surfactant formulation, more preferably 0.1 to 2.5% by weight. The person skilled in the art makes a suitable selection according to the desired properties, especially according to the conditions in the mineral oil formation. It is clear here to the person skilled in the art that the concentration of the surfactants can change after injection into the formation because the formulation can mix with formation water, or surfactants can also be absorbed on solid surfaces of the formation. It is the great advantage of the mixture used in accordance with the invention that the surfactants lead to a particularly good lowering of interfacial tension.

The surfactant mixture preferably comprises a total surfactant concentration in the range from 0.05 to 5% by weight, a total polycarboxylate concentration in the range from 0.01 to 5% by weight and a total concentration of basic salts in the range from 0.025 to 5% by weight.

It is of course possible and also advisable first to prepare a concentrate which is only diluted on site to the desired concentration for injection into the formation. In general, the total concentration of the surfactants in such a concentrate is 10 to 45% by weight.

The mixture used in accordance with the invention can preferably be used for surfactant flooding of deposits whose formation waters comprise more than 25 ppm of alkaline earth metal ions.

The examples which follow are intended to illustrate the invention in detail:

Synthesis of the Surfactants

General Method 1: Alkoxylation by Means of KOH Catalysis

In a 2 l autoclave, the alcohol to be alkoxylated (1.0 eq) is admixed with an aqueous KOH solution which comprises 50% by weight of KOH. The amount of KOH is 0.3% by weight of the product to be prepared. While stirring, the mixture is dewatered at 100° C. and 20 mbar for 2 h. This is followed by purging three times with $N_2$, establishment of a feed pressure of approx. 1.3 bar of $N_2$ and a temperature increase to 120 to 130° C. The alkylene oxide is metered in such that the temperature remains between 125° C. and 135° C. (in the case of ethylene oxide) or 130 and 140° C. (in the case of propylene oxide). This is followed by stirring at 125 to 135° C. for a further 5 h, purging with $N_2$, cooling to 70° C. and emptying of the reactor. The basic crude product is neutralized with the aid of acetic acid. Alternatively, the neutralization can also be effected with commercial magnesium silicates, which are subsequently filtered off. The light-colored product is characterized with the aid of a $^1$H NMR spectrum in $CDCl_3$, gel permeation chromatography and OH number determination, and the yield is determined.

General Method 2: Sulfation by Means of Chlorosulfonic Acid

In a 1 l round-bottom flask, the alkyl alkoxylate to be sulfated (1.0 eq) is dissolved in 1.5-times the amount of dichloromethane (based on % by weight) and cooled to 5 to 10° C. Thereafter, chlorosulfonic acid (1.1 eq) is added dropwise such that the temperature does not exceed 10° C. The mixture is allowed to warm up to room temperature and is stirred under an $N_2$ stream at this temperature for 4 h before the above reaction mixture is added dropwise to an aqueous NaOH solution of half the volume at a maximum of 15° C. The amount of NaOH is calculated to give rise to a slight excess based on the chlorosulfonic acid used. The resulting pH is approx. pH 9 to 10. The dichloromethane is removed at a maximum of 50° C. on a rotary evaporator under gentle vacuum.

The product is characterized by $^1$H NMR and the water content of the solution is determined (approx. 70 percent).

| Alcohol | Description |
|---|---|
| $C_{16}C_{18}$ | Commercially available fatty alcohol mixture consisting of linear $C_{16}H_{33}$—OH and $C_{18}H_{37}$—OH |
| $iC_{17}$ | iso-$C_{17}H_{35}$—OH; oxo alcohol, prepared by hydroformylating isohexadecene, which is obtained by tetramerizing butene. The mean degree of branching of the alcohol is 3.1. |

Description of the Test Methods a) Solubility

An alkyl alkoxy sulfate is dissolved at room temperature in a saline injection water or production water from a deposit (total concentration 500 to 3000 ppm), and NaOH (1000 to 15 000 ppm) and EDTA (ethylenediamine tetraacetate tetrasodium salt) or a polycarboxylate are added. Optionally, butyl diethylene glycol (BDG) is added. Subsequently, the mixture is brought to the deposit temperature. After 24 h, the sample is assessed visually and used further only in the case that a clear solution is present. The injection water of the deposit in question had salinity of 11 250 ppm TDS (total dissolved salt). The deposit temperature was 32° C.

b) Interfacial Tension in addition, interfacial tensions were measured directly by the spinning drop method on a dead crude oil (API approx.

14) and the saline original injection water at deposit temperature of 32° C. For this purpose, the surfactant solution prepared in a) is used. An oil droplet is introduced into this clear solution at deposit temperature and the interfacial tension is read off after 2 h.

c) Phase Separation

In a pipette, 5 ml of crude oil (API 14) and 5 ml of water of salinity 13 510 ppm TDS (total dissolved salt) are mixed in the presence of the above components at 32° C., and the phase separation is observed.

Test Results

The solubility of the formulation described in the injection water is determined. The results can be found in table 1.

Interfacial tensions are measured directly by the spinning drop method on a dead crude oil (API approx. 14) and a saline original injection water with 11 250 ppm TDS (total dissolved salt) comprising 28 ppm of alkaline earth metal ions at deposit temperature 32° C. For this purpose, the original injection water is admixed with 1000 ppm of surfactant, 500 ppm of BDG, 300 to 700 ppm of chelating agent and 3500 ppm of NaOH. An oil droplet is introduced into this clear solution at 32° C., and the interfacial tension is read off after 2 h. The results can be found in table 2.

Finally, the phase separation of 5 ml of oil and 5 ml of water of salinity 13 510 ppm TDS (total dissolved salt) comprising 30 ppm of alkaline earth metal ions is observed in the presence of the above formulations at 32° C.

TABLE 1

Solubility in the injection water at 32° C.

| Ex. | Alkyl-AO-SO$_4$Na [1000 ppm] | BDG [ppm] | NaOH [ppm] | Chelating agent | Salinity [ppm] | T [° C.] | Solubility |
|---|---|---|---|---|---|---|---|
| C1 | C$_{16}$C$_{18}$—6PO—SO$_4$Na | 500 | — | — | 11250 | 32 | Clear |
| C2 | C$_{16}$C$_{18}$—6PO—SO$_4$Na | 500 | 3500 | — | 11250 | 32 | Turbid |
| C3 | — | — | 3500 | — | 11250 | 32 | Turbid |
| C4 | C$_{16}$C$_{18}$—6PO1'SO$_4$Na | 500 | 3500 | EDTA 700 ppm | 11250 | 32 | Clear |
| C5 | C$_{16}$C$_{18}$—6PO—SO$_4$Na | 500 | 3500 | EDTA 300 ppm | 11250 | 32 | Clear |
| C6 | C$_{16}$C$_{18}$—7PO—SO$_4$Na: iC17—7PO—SO$_4$Na = 1:1 | 500 | 3500 | EDTA 700 ppm | 11250 | 32 | Clear |
| 7 | C$_{16}$C$_{18}$—7PO—SO$_4$Na: iC17—7PO—SO$_4$Na = 1:1 | 500 | 3500 | Polyacrylate Na salt (MW ~1200) 300 ppm | 11250 | 32 | Clear |
| 8 | C$_{16}$C$_{18}$—7PO—SO$_4$Na: iC17—7PO—SO$_4$Na = 1:1 | 500 | 3500 | Polyacrylate Na salt (MW ~2500) 300 ppm | 11250 | 32 | Clear |
| 9 | C$_{16}$C$_{18}$—7PO—SO$_4$Na: iC17—7PO—SO$_4$Na = 1:1 | 500 | 3500 | Polyacrylate Na salt (MW ~8000) 300 ppm | 11250 | 32 | Clear |
| 10 | C$_{16}$C$_{18}$—7PO—SO$_4$Na: iC17—7PO—SO$_4$Na = 1:1 | 500 | 5000 | Polyacrylate Na salt (MW ~2500) 300 ppm | 11250 | 32 | Clear |
| C11 | C$_{16}$C$_{18}$—6PO—SO$_4$Na | 500 | 3500 | EDTA 700 ppm | 13510 | 32 | Clear |
| 12 | C$_{16}$C$_{18}$—6PO—SO$_4$Na | 500 | 3500 | Maleic acid/olefin copolymer, Na salt (MW 12000 g/mol) 300 ppm | 13510 | 32 | Clear |

As evident from table 1, in the case of the saline waters which comprise 30 ppm of Ca$^{2+}$ and Mg$^{2+}$, the addition of complexing agent is required if NaOH is added. As can be seen for C1 to C3, the turbidity is clearly attributable to a precipitate of magnesium hydroxide or calcium hydroxide. When complexing agent is added, clear solutions are obtained.

TABLE 2

Measurements on crude oil and injection water at 32° C.

| Ex. | Alkyl-AO-SO$_4$Na [1000 ppm] | BDG [ppm] | NaOH [ppm] | Chelate | Salinity [ppm] | T [° C.] | IFT [mN/m] |
|---|---|---|---|---|---|---|---|
| C1 | C$_{16}$C$_{18}$—6 PO—SO$_4$Na | 500 | — | — | 11250 | 32 | not determined |
| C2 | C$_{16}$C$_{18}$—6PO—SO$_4$Na | 500 | 3500 | — | 11250 | 32 | — |
| C3 | — | — | 3500 | — | 11250 | 32 | — |
| C4 | C$_{16}$C$_{18}$—6PO—SO$_4$Na | 500 | 3500 | EDTA 700 ppm | 11250 | 32 | 0.0182 |
| C5 | C$_{16}$C$_{18}$—6PO—SO$_4$Na | 500 | 3500 | EDTA 300 ppm | 11250 | 32 | 0.0170 |

TABLE 2-continued

Measurements on crude oil and injection water at 32° C.

| Ex. | Alkyl-AO-SO$_4$Na [1000 ppm] | BDG [ppm] | NaOH [ppm] | Chelate | Salinity [ppm] | T [° C.] | IFT [mN/m] |
|---|---|---|---|---|---|---|---|
| C6 | C$_{16}$C$_{18}$—7PO—SO$_4$Na: iC17—7PO—SO$_4$Na = 1:1 | 500 | 3500 | EDTA 700 ppm | 11250 | 32 | 0.0121 |
| 7 | C$_{16}$C$_{18}$—7PO—SO$_4$Na: iC17—7PO—SO$_4$Na = 1:1 | 500 | 3500 | Polyacrylate Na salt (MW ~1200) 300 ppm | 11250 | 32 | 0.0067 |
| 8 | C$_{16}$C$_{18}$—7PO—SO$_4$Na: iC17—7PO—SO$_4$Na = 1:1 | 500 | 3500 | Polyacrylate Na salt (MW ~2500) 300 ppm | 11250 | 32 | 0.0036 |
| 9 | C$_{16}$C$_{18}$—7PO—SO$_4$Na: iC17—7 PO—SO$_4$Na = 1:1 | 500 | 3500 | Polyacrylate Na salt (MW ~8000) 300 ppm | 11250 | 32 | 0.0036 |
| 10 | C$_{16}$C$_{18}$—7PO—SO$_4$Na: iC17—7PO—SO$_4$Na = 1:1 | 500 | 5000 | Polyacrylate Na salt (MW ~2500) 300 ppm | 11250 | 32 | 0.0029 |
| C11 | C$_{16}$C$_{18}$—6PO—SO$_4$Na | 500 | 3500 | EDTA 700 ppm | 13510 | 32 | 0.0103 |
| 12 | C$_{16}$C$_{18}$—6PO—SO$_4$Na | 500 | 3500 | Maleic acid/olefin copolymer, Na salt (MW 12000 g/mol) 300 ppm | 13510 | 32 | 0.0029 |

Table 2 shows the interfacial tensions as a function of the formulation used. As can be seen for C4 and C5, the interfacial tension does not change irrespective of the EDTA content. It is above 0.01 mN/m. The change to a different surfactant system (C6) or a different salinity (C11) allows the interfacial tension still to remain at 0.01 mN/m or higher. Interestingly, significantly lower interfacial tensions can be achieved with the polycarboxylates irrespective of the surfactant system, the NaOH content or the salinity. They are between 3 and 7×10$^{-3}$ mN/m.

The phase separation shows a further difference. In the case of EDTA, 700 ppm are required for a clear water phase, while only 300 ppm are needed in the case of the polycarboxylate (tests correspond to formulations described as C11 and 12 in table 2).

The invention claimed is:

1. A process for tertiary mineral oil production by means of Winsor type III microemulsion flooding, comprising the steps of
    (a) injecting through at least one aqueous injection borehole into a mineral oil deposit, a surfactant mixture, for the purpose of lowering the interfacial tension between oil and water to <0.01 mN/m, wherein the mixture comprises at least the following components:
        (i) one or more polycarboxylate(s) comprising at least 50 mol % of acrylic acid units or methacrylic acid units or maleic acid units or itaconic acid units, or salts thereof, or mixtures thereof, and
        (ii) one or more anionic or nonionic surfactant(s) or mixtures thereof and
    (b) withdrawing crude oil from the deposit through at least one production borehole.

2. The process according to claim 1, wherein the at least one polycarboxylate is a polycarboxylate with a molar mass, measured by means of GPC against a polyacrylate standard, in the range from 500 to 100 000 g/mol.

3. The process according to claim 1, wherein the polycarboxylate is a polyacrylate which comprises at least 80% acrylic acid or sodium salt thereof as a repeat unit.

4. The process according to claim 1, wherein the surfactant mixture comprises one or more nonionic surfactant(s) which is/are selected from the group of the alkyl alkoxylates and alkylaryl alkoxylates.

5. The process according to claim 1, wherein the surfactant mixture comprises one or more anionic surfactant(s) which is/are selected from the group of the alkyl alkoxy sulfates and/or alkyl alkoxy sulfonates.

6. The process according to claim 1, wherein the surfactant mixture comprises basic salts selected from the group of NaOH and Na$_2$CO$_3$.

7. The process according to claim 1, wherein the surfactant mixture has a total surfactant concentration in the range from 0.05 to 5% by weight.

8. The process according to claim 1, wherein the surfactant mixture comprises a total surfactant concentration in the range from 0.05 to 5% by weight, a total polycarboxylate concentration in the range of 0.01 to 5% by weight and a total concentration of basic salts in the range from 0.025 to 5% by weight.

9. The process according to claim 1, wherein the surfactant mixture is used in the presence of formation waters which comprise more than 25 ppm of alkaline earth metal ions.

10. The process according to claim 1, wherein a lowering of the interfacial tension between oil and water to values of 0.01 to 0.0001 mN/m is achieved.

* * * * *